UNITED STATES PATENT OFFICE.

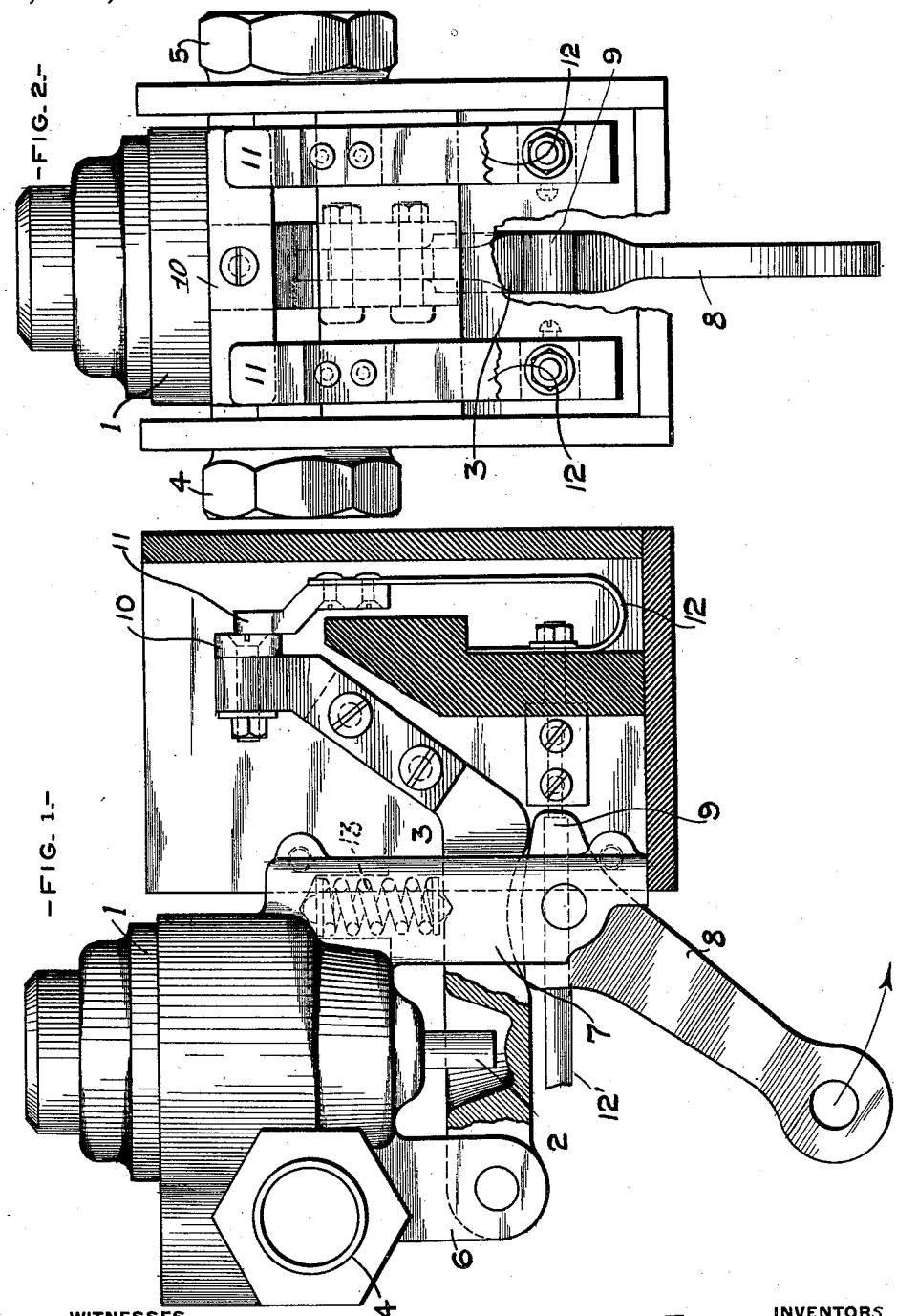

FRANK HEDLEY, OF YONKERS, AND JAMES S. DOYLE, OF MOUNT VERNON, NEW YORK.

COMBINED CONDUCTOR'S VALVE AND EMERGENCY-SWITCH.

1,082,951. Specification of Letters Patent. Patented Dec. 30, 1913.

Application filed July 11, 1912. Serial No. 708,834.

*To all whom it may concern:*

Be it known that we, FRANK HEDLEY and JAMES S. DOYLE, both citizens of the United States, residing, respectively, at Yonkers and Mount Vernon, in the county of Westchester and State of New York, have invented a certain new and useful Improvement in Combined Conductors' Valves and Emergency-Switches, of which the following is a specification.

This invention relates to safety devices for electrically propelled cars having an automatic air brake system, and has for its object to provide an improved combined conductor's valve and emergency switch which may be operated by the conductor or other person, in case of emergency, to cause the automatic application of the brakes, and to cut off the supply of current to the motors, and thereby stop the car in the shortest possible time.

In the accompanying drawings: Figure 1 is a side elevation, with a portion shown in section; and, Fig. 2, an end view, with the end of the switch casing removed, of a combined conductor's valve and emergency switch, embodying our improvement.

According to the construction shown in the drawing, the valve casing, 1, contains the usual puppet valve, (not shown) having stem, 2, extending out through the casing, for actuation by a lever, 3, for opening communication from one of the tapped openings, 4, to which the train pipe of the automatic air brake system is connected, to the other opening, 5, which discharges to the atmosphere, the valve being normally closed by a spring and the pressure in the train pipe. The lever, 3, may be pivoted upon lugs, 6, and extend between another pair of lugs, 7, on which is pivoted a cam lever, 8, having a cam portion, 9, adapted to engage the lever, 3, and actuate the same to open the valve, when the lever is moved in the direction of the arrow. The lever, 3, is also preferably extended to carry the switch bar, 10, adapted to connect the terminals, 11, of the spring leads, 12. These leads are connected by suitable wires, 12, to any circuit that controls the supply of current to the motors, either directly or indirectly, and this switch is particularly adapted to be employed in the control or line switch circuit of a master controller of the unit switch system now ordinarily used upon electrically propelled cars which may run singly or be coupled up in trains. A spring, 13, may be mounted to bear upon the lever, 3, to hold the switch normally closed.

When the lever, 8, is turned in the direction of the arrow, the cam, 9, engages the under side of lever, 3, raising the switch bar, 10, to open the circuit at the contact points, 11, and at the same time raising the stem, 2, to open the conductor's valve. The current to the car motors is thereby cut off, and the automatic air brakes are promptly applied so as to stop the car in the shortest possible distance.

A flexible cord or any suitable mechanical connection may be attached to the lever, 8, for actuating the same, or if preferred, an electrical circuit including a magnet or solenoid may be employed for this purpose.

Having now described our invention, what we claim as new and desire to secure by Letters Patent; is:

1. In a car controlling system, the combination with a conductor's valve for an air brake equipment, of an electrical circuit with a switch for controlling the propelling power, a spring for normally holding the switch closed, a lever for actuating said valve and switch, and another lever for operating the switch lever.

2. In a car controlling system, the combination with a conductor's valve for an air brake equipment, of an electrical circuit containing a switch for controlling the propelling power, a pivoted arm carrying a switch member for said circuit, said valve having a projecting stem adapted to be actuated by said arm, and a lever for operating said pivoted arm.

3. The combination, with a conductor's valve for an air brake system, of a switch for controlling an electric circuit, a lever for actuating the valve and carrying a switch bar, and a cam lever for operating said switch lever.

In testimony whereof we have hereunto set our hands.

FRANK HEDLEY.
JAMES S. DOYLE.

Witnesses:
H. M. NORRIS,
C. V. SMITH.